Patented Sept. 12, 1933

1,926,369

UNITED STATES PATENT OFFICE 1,926,369

PEANUT BUTTER

Leo C. Brown, Chicago, Ill., assignor to E. K. Pond Company, Chicago, Ill., a corporation of Illinois No Drawing. Application June 17, 1932
Serial No. 617,875

20 Claims. (Cl. 99—11)

This invention relates to improvements in food products of paste-like consistency of the character of nut butter, such as peanut butter or the like. The invention also relates to the method of preparing such food products.

This invention is concerned with paste-like food substances of which one ingredient is a finely divided solid and another ingredient is an oil. It is well known that nut butters such as peanut butter, are composed of ingredients of this type. Accordingly, it should be understood that this invention is of sufficient breadth to cover all such products and that it should not be restricted to peanut butter which is recited specifically in this specification merely as one preferred and illustrative development of the invention.

It is known to those skilled in the art that nut butters, such as peanut butter, are prepared by grinding the clean kernels of roasted nuts. In the case of peanut butter, the final product is a semi-solid paste-like substance of rather thick consistency, which consists essentially of minute particles of nut kernels mixed with oil which has been extracted from the kernels themselves. The oil is liberated during the grinding process by the rupture of the minute cells in the body of the kernel whereby the oil is permitted to run together and form a carrier liquid in which the particles of ground kernel are suspended. As the particles of kernel are insoluble in the liberated oil, the mixture of the solid and oil constituents forms a paste-like mixture composed of approximately 40 to 50 per cent of oil varying somewhat with the type of nuts used.

Due to the nature of such products, it is found in practice, that there is a tendency toward gravitational separation of the solid particles mixed or suspended in the oil carrier whereby after periods of time, such as may occur in marketing and consuming the products, an oil layer will separate from the mix and collect on top. This is objectionable because it impairs the appearance and salability of the product and also results in an oil deficiency in the portions of the product last consumed because the accumulated oil is usually disposed of with that portion of the product first taken from the jar or other container.

To avoid this last objection, it is necessary to keep the product well stirred and mixed during the period of consumption which cannot be expected of the consumers, and therefore the elimination of the necessity constitutes a marked improvement in the art.

Another serious difficulty which has been suffered heretofore is that peanut butter made in the usual way, does not mix readily with saliva when taken into the mouth and therefore has a tendency to adhere to the roof of the mouth. This is disagreeable and limits to a considerable extent, the usefulness of peanut butter in the diet.

Accordingly, it is an object of this invention to provide a new and improved food product of the above described character which will continue to exist as a homogeneous mass, free from the objectionable gravitational separation of the solid and oil ingredients and in the case of nut butter, such as peanut butter, to provide a product which is more readily mixed with saliva when taken into the mouth and is therefore free from the objectionable tendency to adhere to the roof of the mouth.

It is a further object of this invention to provide a new and useful change in the usual practice of making nut butter which aids greatly in overcoming both of the above stated objections.

This invention proceeds upon the principle of adding a material to nut butter such as peanut butter, prepared in the ordinary way, which will prevent the gravitational segregation of the solid, finely comminuted particles from the oil carrying medium.

The added material, glyceryl ester of fatty acid having a free glyceryl alcohol group, is a fragment of a fat molecule possessing one or more free alcohol groups and one or more ester groups. Specifically, the material may be the mono glyceryl ester of a fatty acid or the di glyceryl ester of a fatty acid or a mixture of both. Both the mono and the di glyceride of a fatty acid are esters of the alcohol "glycerol" and a fatty acid and each have a free alcohol group in each molecule. The addition of such material to the peanut butter is found to have two functions, one of which is its function as an emulsifying agent for the oil medium whereby the oil is more readily mixed with the saliva of the mouth and thereby eliminates the objectionable adherence of the peanut butter to the roof of the mouth. The second function is that of peptizing the finely divided solids which results in substantial elimination of objectionable segregation of solids from the oil. This invention is not concerned with the preparation of the mono or di glyceryl ester of fatty acid and it is not believed necessary to describe a particular method of preparation.

The mono or di glyceryl ester of a fatty acid is soluble in the oil such as peanut oil and may be added in either solid or liquid form preferably at a somewhat elevated temperature, or if desired, it may be incorporated in peanut or other oils and added together with this oil to the ground nuts or finished butter.

Because of the solubility of this material in the nut oil, it needs only to be mixed thoroughly to accomplish complete homogeneity. The mono or di glyceryl ester of various fatty acids may be employed but by way of illustration, the mono or di glyceryl ester of stearic acid may be mentioned as preferable.

By way of illustration, in one practical method for accomplishing the purpose of this invention, the blanched, roasted peanuts are treated to remove the hearts and red skins. They are then subjected to an extraction process to remove a portion of the oil. This may be done by any one of several methods, such as pressing with a hydraulic press or continuous expeller. The resulting cake is then ground through a mill and mixed together with suitable amounts of salt, sugar or other flavoring materials, usually under slightly increased temperatures to facilitate the mixing operations. The mono or di glyceryl ester of the fatty acid is then melted and dissolved in that portion of the oil which was removed by the extraction or pressing operation and the solution is then added to the above mixture while agitation is continued. In quantity, the mono glyceryl ester may be added up to 10 per cent by weight of the entire mixture but in practice, it will be found unnecessary to use such a large quantity, as the desired results will usually require from 1 per cent to 5 per cent.

After the mass has been thoroughly mixed to form a homogeneous paste or nut butter, the product can then be packaged and sold in the usual manner or put through a mill to be more finely comminuted in accordance with the type of product that it is desired to market.

As an alternative procedure, it is entirely practical and good results are realized when the melted mono or di glyceryl ester of fatty acid is melted and added to the finely comminuted nuts and the mixture agitated until a homogeneous paste, is produced. When this last method is employed, the entire quantity of oil contained in the nut kernels may remain mixed therewith as distinguished from extracting a portion thereof in accordance with the first described method.

A primary function in this invention is that of preventing the gravitational separation of the solid particles from the oil carrier medium, and in addition thereto, the function as an emulsifying agent which promotes the mixability of the product with saliva when taken into the mouth and thereby eliminates the tendency of the nut butter to adhere to the roof of the mouth.

It is to be understood that this invention is comprehensive and includes all nut butters and similar products and is consequently not limited to peanut butter. The term "fatty acid" as used in the claims is used in a restricted sense to include those fatty acids found in such normal fats as butter, cocoanut oil, peanut oil, cottonseed oil, hog fat, beef fat, mutton fat, and other edible fats and oils.

I claim:

1. As an article of manufacture, a new food product composed of a mixture of finely divided solid nut particles and a carrier medium of oil together with a small percentage of glyceryl ester of a fatty acid having a free glyceryl alcohol group.

2. As an article of manufacture, a new food product composed of finely comminuted peanuts together with a small percentage of glyceryl ester of a fatty acid having a free glyceryl alcohol group.

3. As an article of manufacture, a new food product consisting of finely comminuted peanuts to which has been added up to 10% of glyceryl ester of a fatty acid having a free glyceryl alcohol group.

4. The process of manufacturing an improved nut butter which comprises adding and dissolving therein a small percentage of glyceryl ester of a fatty acid having a free glyceryl alcohol group, during one of the stages of mixing or grinding.

5. The process of manufacturing an improved peanut butter which comprises pressing peanuts for the extraction of a portion of the oil, grinding the pressed residue, dissolving a small percentage of glyceryl ester of a fatty acid having a free glyceryl alcohol group in the extracted oil and finally mixing the ground kernels and oil solution to form a homogeneous paste-like mixture.

6. As an article of manufacture, a new food product composed of a mixture of finely divided solid nut particles and a carrier medium of oil, together with a small percentage of di glyceryl ester of a fatty acid.

7. The process of manufacturing an improved nut butter which comprises adding and dissolving therein a small percentage of di glyceryl ester of a fatty acid during one of the stages of mixing or grinding.

8. As an article of manufacture, a new food product composed of a mixture of finely divided solid nut particles and a carrier medium of oil, together with a small percentage of a mixture of mono glyceryl ester of a fatty acid and di glyceryl ester of a fatty acid.

9. The process of manufacturing an improved nut butter which comprises adding and dissolving therein a small percentage of a mixture of mono glyceryl ester of a fatty acid and di glyceryl ester of a fatty acid, during one of the stages of mixing or grinding.

10. As an article of manufacture, a new food product composed of a mixture of finely divided solid nut particles and a carrier medium of oil, together with a small percentage of mono-glyceryl ester of a fatty acid.

11. As an article of manufacture, a new food product composed of finely comminuted nut kernels together with a small percentage of mono-glyceryl ester of a fatty acid.

12. As an article of manufacture, a new food product composed of a mixture of finely comminuted nut kernels including solid particles and an oil carrier medium togther with a small percentage of mono-glyceryl ester of a fatty acid.

13. As an article of manufacture, a new food product composed of finely comminuted peanuts together with a small percentage of mono glyceryl ester of a fatty acid.

14. As an article of manufacture, a new food product consisting of finely comminuted peanuts to which has been added up to ten per cent of mono glyceryl ester of a fatty acid.

15. As an article of manufacture, a new food product consisting of finely comminuted peanuts to which has been added from one to five per cent of mono glyceryl ester of a fatty acid.

16. As an article of manufacture, a new food product consisting of finely comminuted peanuts to which has been added up to ten per cent of mono glyceryl ester of stearic acid.

17. As an article of manufacture, a new food product consisting of finely comminuted peanuts to which has been added from one to five per cent of mono glyceryl ester of stearic acid.

18. The process of manufacturing an improved nut butter which comprises adding and dissolving therein, a small percentage of mono glyceryl ester of a fatty acid during one of the stages of mixing or grinding.

19. The process of manufacturing an improved nut butter which comprises adding and dissolving therein, from one to five per cent of mono glyceryl ester of a fatty acid during one of the stages of mixing or grinding.

20. The process of manufacturing improved peanut butter which comprises pressing peanuts for the extraction of a portion of the oil, grinding the pressed residue, dissolving a small percentage of the mono glyceryl ester of fatty acid in the extracted oil and finally mixing the ground kernels and oil solution to form a homogeneous paste-like mixture.

LEO C. BROWN.